May 10, 1927.
W. VON ELM
1,627,757
COMBINED BAKING PAN, COOKING UTENSIL, AND MOLD
Filed May 18, 1926
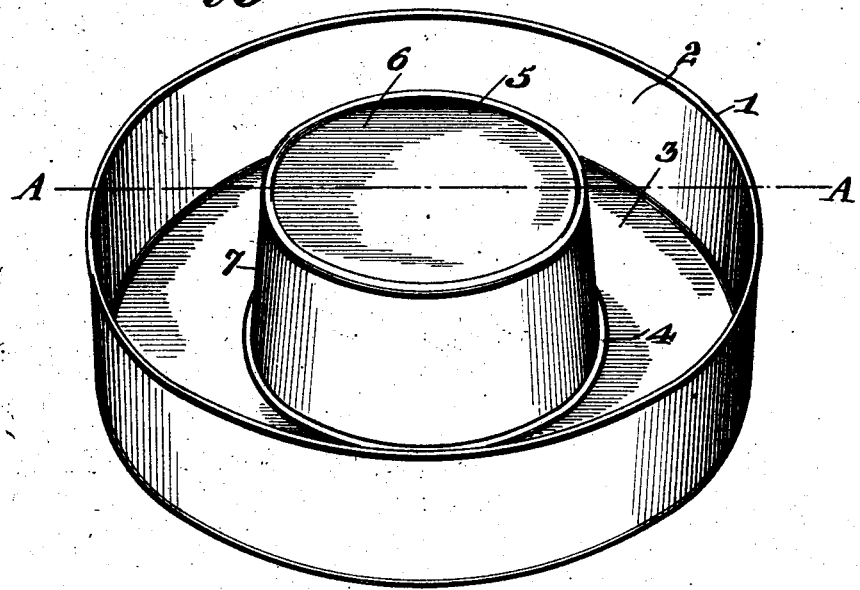
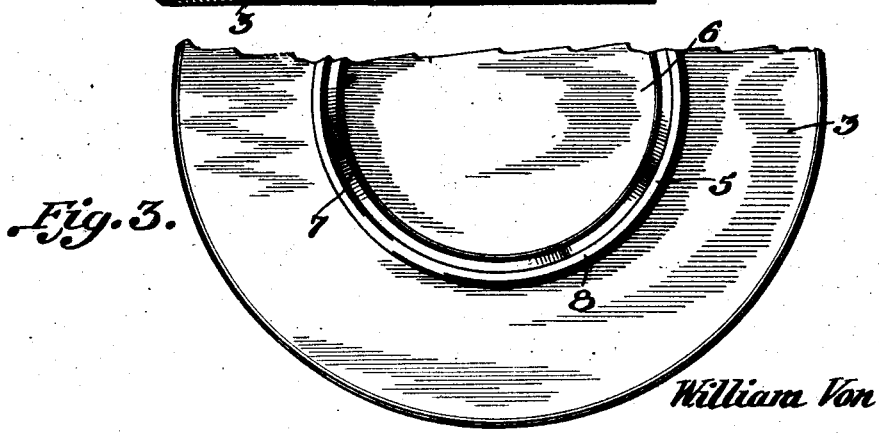
Inventor
William Von Elm
By Mason Fenwick & Lawrence
Attorneys Patented May 10, 1927.

1,627,757

UNITED STATES PATENT OFFICE.

WILLIAM von ELM, OF BROOKLYN, NEW YORK.

COMBINED BAKING PAN, COOKING UTENSIL, AND MOLD.

Application filed May 18, 1926. Serial No. 109,992.

This invention relates to a combined baking pan, cooking utensil and mold.

The object of this invention is to produce a utensil comprising a seamless tube and a seamless body, the seamless tube inverted in a seamless body forming a single utensil, which is capable of being used as a baking pan, a cooking utensil or a mold.

The chief novelty lies in the making of a seamless tube and a seamless pan, inverting the seamless tube in the seamless pan in such a manner as to form a unified structure in which no solder or similar material is used and which may be utilized either as a mold, a baking pan or a cooking utensil.

Other novelty lies in the many utilities to which the utensil may be subjected.

Still other novelty lies in the fact that no matter which utensil is used, the bottom surface of the utensil used always comes into contact with the surface heated when used as a baking pan or a cooking utensil.

Other novelty lies in the inner pan projecting above the edge of the outer pan.

Still other novelty lies in combining a mold with a baking pan and a cooking utensil.

Further novelty is disclosed in the drawings and specification.

In the drawings, like numerals designate similar parts.

In the drawings:

Figure 1 is a perspective of the pan.

Figure 2 is a side elevation showing a section through line A—A of Figure 1.

Figure 3 is a bottom plan of the pan with a section broken off.

Referring to the drawings, numeral 1 designates the seamless body of a pan. Numeral 2 designates the wall thereof. Numeral 3 designates the bottom. Numeral 4 designates the edge. Within the body of pan 1 is an inverted, seamless tube 5 having top 6 and side walls 7. Interlocking with the bottom edge 4 of body 1 is a turned over top edge 8 of inner tube 5.

As actually used, dough or cake or other substances may be placed in the body of pan 1 and the result is a cake with the center removed. By having the bottom of tube 2 project above the sides of pan 1, a twofold advantage is obtained. First, the contents of pan 1 may be easily removed by simply inverting the pan 1 and striking the projecting bottom of tube 2 on the table or other surface. Secondly, if the inner tube 2 is desired to be used as a cooking utensil, the bottom projecting above the sides of pan 1 will come in contact with the heated surface which is a decided advantage.

The utensil as described may also be used as a mold in the preparation of ice-creams, jellies and similar articles. By using the inner tube a solid form may be obtained whereas by using the outer tube, an article with the center removed results.

By having all these features incorporated in a single utensil a very handy and valuable article for household use is produced.

As manufactured, the tube and pan are formed without a seam. The tube 5 is then inverted in pan 1 and its top edge 8 which is slightly turned over fitted in to the bottom edge 4 of pan 1. The two edges are then "bumped" into an interlocked position which is liquid-proof and is a decided advantage over any similar utensil where solder or a similar material is used.

It is apparent that a utensil could be made out of one piece but I prefer to make it as shown and described here; however, if it should be desired to make the utensil described out of one piece by die-pressing or other process, the parts therein would be considered the equivalent of the parts described in the present invention.

What I claim is:

A cooking utensil comprising an outer cylindrical wall section of sheet material having an annular flange extending inwardly therefrom, and integral therewith to provide a circular opening concentric with the cylindrical wall section, a seamless frusto-conical receptacle inserted in said opening with its bottom projecting beyond the edge of said wall section remote from said flange, the contacting edges of said flange and said receptacle being turned over each other at an obtuse angle to the flange and receptacle wall, respectively, to form a hook joint and lock the receptacle to the flange, the turned over edge of said receptacle extending outwardly from the receptacle and said flange being dished toward the circular opening therein to hold the open end of said receptacle in the same plane as the edge formed by the intersection of a said wall section and said flange.

In testimony whereof I affix my signature.

WILLIAM von ELM.